United States Patent [19]

Goddard

[11] 4,346,061
[45] Aug. 24, 1982

[54] PURIFICATION OF AMMONIUM TUNGSTATE SOLUTIONS

[75] Inventor: John B. Goddard, Grand Island, N.Y.

[73] Assignee: Union Carbide Corporation, Danbury, Conn.

[21] Appl. No.: 249,504

[22] Filed: Mar. 31, 1981

[51] Int. Cl.³ .............................................. C01G 41/00
[52] U.S. Cl. ........................................ 423/56; 423/54; 423/593; 23/302 A
[58] Field of Search .................... 423/55, 56, 593, 54; 23/302 A, 305 R

[56] References Cited

U.S. PATENT DOCUMENTS

| | | | |
|---|---|---|---|
| 3,079,226 | 2/1963 | Newkirk | 423/55 |
| 3,158,438 | 11/1964 | Kurtak | 23/22 |
| 3,256,058 | 6/1966 | Burwell | 423/56 |
| 3,829,550 | 8/1974 | Ronzio et al. | 423/55 |
| 4,092,400 | 5/1978 | Zbranek et al. | 423/593 |
| 4,115,513 | 9/1978 | Kulkarni et al. | 423/55 |
| 4,168,296 | 9/1979 | Lundquist | 423/56 |

FOREIGN PATENT DOCUMENTS 456789  1/1975  U.S.S.R. ................................ 423/55

OTHER PUBLICATIONS

V. P. Taushkanov, A. A. Blokhin, M. I. Semenov, E. A. Andronov, V. A. Kuchatov, and V. K. Rumyantsev, Zhur. Prilad. Khim. 51 (3), 481–483 (1978); J. Applied Chem. USSR 51 (3), 475–477, (1978).

S. W. H. Yih and C. T. Wang, "Tungsten", Plenum Press, New York, 1979, p. 103.

*Primary Examiner*—Herbert T. Carter
*Attorney, Agent, or Firm*—John R. Doherty

[57] ABSTRACT

Prior to evaporative crystallization of ammonium tungstate solutions to give ammonium paratungstate (APT), an aluminum compound, e.g. aluminum sulfate solution, is added to precipitate silicon and phosphorus impurities. The yield of crystallized ammonium paratungstate is thereby increased.

9 Claims, No Drawings

PURIFICATION OF AMMONIUM TUNGSTATE SOLUTIONS

The present invention is directed to the recovery of tungsten from tungsten ores and concentrates. More particularly, the present invention is directed to the treatment of ammonium tungstate solutions obtained in the course of recovering tungsten from ores and concentrates.

Tungsten ores and concentrates are, as is known in the art, subjected to digestion with alkaline solutions and subsequent acid treatment, solvent extraction and ammonia stripping to obtain a solution of ammonium tungstate which invariably contains dissolved silicon and phosphorus impurities which originated with the tungsten ore. The solution is conventionally fed to an evaporative crystallizer where evaporation occurs and crystals of ammonium paratungstate (APT) are formed and recovered by filtration. It has been found that the presence of dissolved silicon and phosphorus in the ammonium tungstate solution adversely affects the yield of tungsten obtained by crystallization.

It is accordingly an object of the present invention to improve the yield of tungsten by removing silicon and phosphorus impurities from ammonium tungstate solutions prior to crystallization.

Other objects will be apparent from the following description and claims.

During the alkaline digestion of tungsten ores and concentrates, impurities such as molybdenum, silicon, and phosphorus dissolve as well as tungsten. Subsequent processing of the tungstate leach liquor removes a portion of the impurities. For instance, after sodium carbonate or sodium hydroxide digestion of scheelite or wolframite concentrates, the filtrate is typically treated with sodium hydrosulfide (NaHS) and acidified with sulfuric acid to precipitate molybdenum as $MoS_3$. Some silicon precipitates also at this point. The acidified filtrate is then subjected to amine solvent extraction of the tungsten to separate it from the aqueous sodium sulfate solution. Although some of the silicon and phosphorus remain with the aqueous raffinate, some is also extracted with the tungsten as heteropolytungstate anions, e.g. $SiW_{12}O_{40}^{4-}$ and $PW_{12}O_{40}^{3-}$. Other heteropoly forms are also possible. When the tungsten-bearing organic phase is stripped, e.g. with aqueous ammonia, some silicon precipitates from the aqueous phase, but some of the silicon and most of the phosphorus remain dissolved in the resultant ammonium tungstate solution. The ammonium tungstate solution is then typically fed to an evaporative crystallizer, whereby ammonium paratungstate (APT), $(NH_4)_{10}W_{12}O_{41}.5H_2O$, crystallizes. Any tungsten complexed with silicon or phosphorus does not crystallize as APT; it remains dissolved in the crystallizer mother liquor. Some tungsten will remain in the mother liquor even if no silicon and phosphorus are present; but the amount of tungsten remaining dissolved in the crystallizer mother liquor containing silicon and phosphorus can be many times that in liquor containing no silicon and phosphorus. Table I shows the effect of phosphorus and silicon (measured as $SiO_2$) on the APT crystallizer yield when ammonium tungstate feed solutions containing 215-230 g. $WO_3$/l. are evaporated to give APT crystals and a mother liquor volume equal to 10% of the feed volume. Every 0.1 g. P/l. in the feed leads to about a 50-60 g. $WO_3$/l. increase in the mother liquor concentration; for every 0.1 g. $SiO_2$/l. in the feed, the mother liquor concentration increases by about 35-37 g. $WO_3$/l. The tungsten in the mother liquor generally is not lost, but must be recycled, e.g. by precipitation as synthetic scheelite ($CaWO_4$) by adding $CaCl_2$ and/or $Ca(OH)_2$. The synthetic scheelite can then be returned to the sodium carbonate digestion step for redissolution of the tungsten, and the tungsten-barren aqueous phase can be disposed of as waste. Recycling the tungsten in this way involves the expense of additional alkaline reagent (e.g., sodium carbonate), sulfuric acid, and ammonia, and increases the required capacity of the processing circuit for a given production level of APT. Removal of part or all of the silicon and phosphorus from the crystallizer feed solution results in higher crystallizer yields of APT. Thus the tungsten in the mother liquor is reduced, the reagent costs per pound of product are reduced, and the output of a circuit of fixed capacity is increased.

TABLE I

Results of Crystallizing APT from Feeds Containing 215-230 g.$WO_3$/l. and Various Amounts of P and $SiO_2$

| Grams P per Liter of Crystallizer Feed | Grams $SiO_2$ per Liter of Crystallizer Feed | Grams $WO_3$ per Liter of Mother Liquor | APT Yield (%) |
|---|---|---|---|
| 0 | 0 | 75.0, 82.5 | 96.5, 96.3 |
| 0.020 | 0 | 80.5 | 96.2 |
| 0.10 | 0 | 126.8 | 94.1 |
| 0.30 | 0 | 253.3 | 88.1 |
| 0 | 0.26 | 174.9 | 92.2 |
| 0 | 0.52 | 273.5 | 87.8 |
| 0 | 0.785 | 375.0 | 83.2 |

Addition of solutions of aluminum salts such as alum (hydrated aluminum sulfate) to sodium tungstate digester solutions is a recognized process for precipitating silicon. For instance, in Yih and Wang, "Tungsten", Plenum Press, New York, 1979, p.103, the use of alum to remove silica from sodium tungstate solutions is described. The tungsten loss to the aluminum hydroxide-silica precipitate is about 1% of the total tungsten present.

It has been found that, rather than adding alum to the sodium tungstate digester solution, it is best to add it to the ammonium tungstate crystallizer feed solution directly, i.e. immediately before crystallization of APT. Some silica precipitates during cooling, sulfiding, and acidification of the sodium tungstate digester solution. This is filtered off with the $MoS_3$ precipitate. After solvent extraction of the tungsten, some silicon and phosphorus remain in the aqueous phase, the solvent extraction raffinate. This is discarded. After solvent extraction and stripping of the solvent with aqueous ammonia, some silica precipitates from the ammonium tungstate solution by digesting 1 hour or more at a temperature equal to or greater than 50° C. (For example, see U.S. Pat. No. 3,158,438—Kurtak). All of this above-mentioned silicon and phosphorus is removed without the use of any chemicals added for the specific purpose of removing silicon and phosphorus. For instance, digester solutions from processing scheelite concentrates with sodium carbonate solution often contain silica in amounts of 2-3 g./Liter or more, but the corresponding crystallizer feed usually contains less than 1 g.$SiO_2$/Liter. Hence, additions of aluminum to the digester solutions result in the precipitation of much silicon and phosphorus that would have been removed anyway during the course of processing. This means that much more aluminum is used than is really necessary if the sodium tungstate digester solutions are treated, since higher silicon levels require larger amounts of aluminum for removal. Also, the more aluminum used, the more tungsten is lost by coprecipitation. Thus, it is important to use as little aluminum as possible. Holding the aluminum addition step until preparation of the ammonium tungstate crystallizer feed solution means that less than aluminum is needed than would be required for the corresponding sodium tungstate digester solution. It has also been found that much less tungsten is lost to the aluminum hydroxide-silica precipitate if ammonium tungstate solutions rather than sodium tungstate solutions are treated with soluble aluminum salts.

Processing scheelite concentrates by sodium carbonate digestion or wolframite concentrates by sodium carbonate or sodium hydroxide digestion, followed by sulfide treatment of the digester filtrate, acidification, filtration to remove $MoS_3$, solvent extraction with an amine solvent to extract tungsten from the aqueous phase, stripping the tungsten with aqueous ammonia, digesting at 50° C. or higher to precipitate silica, crystalling APT by evaporative crystallization to about 5–10% of the original volume, and recycling the tungsten in the mother liquor, is normally sufficient to produce an APT product which meets filament grade specifications without the necessity of alum treatment. The use of alum to reduce the silicon and phosphorus content of the ammonium tungstate crystallizer feed solution means higher yields of APT are achieved under the same conditions, i.e. less tungsten must be recycled. However, it has been feared in the past that adding alum to the ammonium tungstate crystallizer feed stream, i.e. after solvent extraction instead of before solvent extraction, would result in a contamination of the product APT with aluminum. In order to avoid the use of alum in precipitating silicon and phosphorus from ammonium tungstate solutions, the substitution of ferric iron as carrier has been proposed (Taushkanov et. al., Zhur. Priklad. Knim. 51(3), 481-3 (1978)). The iron hydroxide does carry down some silica and phosphorus, but suffers from the drawback that significant amounts of tungsten are carried down as well. To be acceptable as filament grade material, the APT must contain no more than 20 ppm Al. We have found that when the alum treatment is carried out under the specified conditions, APT containing less than 20 ppm Al is readily prepared. Also, very little tungsten is carried down and lost by this process.

The aluminum treatment is best carried out by adding a concentrated alum solution to the ammonium tungstate crystallizer feed solution. The resultant aluminum hydroxide slurry should be stirred for about 0.5–3 hours at 50° C. or higher. The stirring or digestion period serves to complete the phosphorus and silicon removal and serves also to redissolve any coprecipitated tungsten. For minimum alum usage, the ammonium tungstate strip solution may be digested 1–2 hours before adding alum; some silica will precipitate at this time without alum treatment, as noted in the Kurtak patent mentioned above. Then the supernate or filtrate from such treatment can be treated with alum solution. The alum required for efficient removal of silicon, i.e. to a level of approximately 0.05 g. $SiO_2$/Liter or lower, varies with the initial silicon content of the ammonium tungstate solution. Generally, it is preferred to use about 0.3–2 parts by weight Al per part $SiO_2$. Higher amounts of alum up to about 4 or more parts by weight Al per part $SiO_2$ may be used, but increased tungsten losses may result. Higher amounts are beneficial for removing additional phosphorus, which is not as effectively precipitated as silicon. Lower amounts of alum may also be used, but silica removal will only be partial.

Table II shows the results of treating ammonium tungstate crystallizer feed (220 g.$WO_3$/l, 62 g.$NH_3$/l, 0.13 g.P/l, 0.33 g.$SiO_2$/l) with 0.5 M $Al_2(SO_4)_3$. The crystallizer feed had previously been digested approximately 90 minutes at 50° C. without alum to remove some silica. The alum-treated solution was then digested for 2 hours at 50°–61° C. The aluminum hydroxide precipitate was then filtered off, a portion of the filtrate was analyzed for P and $SiO_2$, and the APT was recovered by evaporative crystallization to 10% of the original liquor volume, followed by filtration and water rinsing. This crystallization procedure was followed for all tests described herein below. As the alum addition was increased, the phosphorus and silicon levels in solution decreased and the APT yield increased correspondingly. The yield improvement for test 5 over test 4 of Table II can be traced solely to the additional removal of phosphorus, as the silicon solution level actually increased somewhat, at least based on the solution analysis.

In a second comparative example (Table III), the effect of alum treatment on ammonium tungstate solution freshly stripped from the organic phase was determined. This freshly stripped solution contained 198 g.$WO_3$/liter, 0.050 g.P/liter, 0.60 g.$SiO_2$/liter. In test 6, this solution was digested 90 minutes without alum treatment to precipitate silica, according to the above-noted Kurtak patent (U.S. 3,158,438). The phosphorus and silica levels in the filtrate were decreased to 0.045 and 0.50 g/l, respectively, and the APT yield was 87.1%. In test 7, another sample of the freshly stripped solution was treated with 0.75 M $Al_2(SO_4)_3$ solution to give an initial aluminum level of 0.15 g/l. After a 90-minute digestion period at 45°–50° C., the phosphorus and silica levels in the filtrate had decreased to 0.046 and 0.23 g/l, respectively, and the APT yield had increased to 92.4%.

A definite digestion period should be allowed after adding the aluminum. Generally, increasing the digestion time increases the amount of precipitated silicon and phosphorus and decreases the amount of coprecipitated tungsten.

Table IV shows the results of treating an ammonium tungstate crystallizer feed solution (the same solution used for tests 1–5) with 0.90 M $Al_2(SO_4)_3$ solution to give 0.32 g. Al/liter, and digesting for 5–150 minutes prior to filtering. The APT yield stabilized at 94.3–94.8% after about 30 minutes. Without alum treatment, the APT yield was 87.8% (test 1, Table II). The coprecipitated tungsten did not decrease significantly between 1 and 2.5 hours. Phosphorus continued to be removed throughout the test span of 2.5 hours. After 15 minutes, the amount of silicon removed did not increase greatly.

Table V shows the results of digestion times up to 48 hours on the aluminum content of the mother liquor and of the APT Product. The ammonium tungstate solution used was the same feed material employed in tests 1–5. The entrained tungsten continued to decrease with digestion time, reaching a very low loss of 0.03% after 48 hours. As seen in tests 8–13, the precipitated phosphorus continued to increase, but the amount of precipitated silica did not change greatly. The soluble aluminum in the mother liquor increased substantially by digesting for 24 hours in contrast to 1.5 hours. This did not hurt the purity of the APT product, however. The 20 ppm specification was met in each case. Insufficient washing of the APT product would hurt the purity with regard to aluminum more for the 24-48 hour digestion times, however; this, as well as the impracticality of providing for such long retention times, is a drawback to using long digestion periods for actual plant practice.

TABLE II

Effect of Alum Treatment on APT Crystallizer Yield
(Sample previously digested approximately
90 minutes at ~ 50° C. without alum)

| Test | g.Al/ Liter | Digestion Temp. (°C.) | Digestion Time (hr) | Filtrate (g/l) P | Filtrate (g/l) SiO$_2$ | APT Yield (%) |
|---|---|---|---|---|---|---|
| 1 | 0 | — | 0 | 0.13 | 0.33 | 87.8 |
| 2 | 0.041 | 52–61 | 2 | 0.12 | 0.06 | 90.3 |
| 3 | 0.081 | 50–55 | 2 | 0.10 | 0.03 | 92.9 |
| 4 | 0.24 | 50–55 | 2 | 0.09 | 0.01 | 94.5 |
| 5 | 0.56 | 51–53 | 2 | 0.02 | 0.045 | 96.1 |

TABLE III

Effect of Alum Treatment on APT Crystallizer Yield
(Freshly Stripped; No Prior Digestion).

| Test | g.Al/ Liter | Digestion Temp. (°C.) | Digestion Time (hr) | Filtrate (g/l) P | Filtrate (g/l) SiO$_2$ | APT Yield % |
|---|---|---|---|---|---|---|
| 6 | 0 | 45–50 | 1.5 | 0.045 | 0.50 | 87.1 |
| 7 | 0.15 | 45–50 | 1.5 | 0.046 | 0.23 | 92.4 |

TABLE IV

Effect of Alum Digestion Time on Tungsten, Silicon, and Phosphorus Precipitation and APT Yield

| Test | g.Al/ Liter | Digestion Temp. (°C.) | Digestion Time (hr) | % Precipitated by alum treatment W | % Precipitated by alum treatment P | % Precipitated by alum treatment Si | APT Yield (%) |
|---|---|---|---|---|---|---|---|
| 8 | 0.32 | 45–56 | 0.083 | 0.34 | 12.8 | 57.0 | 91.9 |
| 9 | 0.32 | 45–56 | 0.25 | 0.26 | 15.4 | 79.1 | 94.1 |
| 10 | 0.32 | 45–56 | 0.52 | 0.21 | 20.8 | 75.9 | 94.5 |
| 11 | 0.32 | 45–56 | 1.0 | 0.17 | 25.6 | 82.4 | 94.3 |
| 12 | 0.32 | 45–56 | 1.5 | 0.19 | 40.2 | 82.7 | 94.8 |
| 13 | 0.32 | 45–56 | 2.5 | 0.16 | 45.0 | 87.7 | 94.6 |

TABLE V

Effect of Alum Digestion Time on Aluminum Content of APT and of APT Mother Liquor

| Test | g.Al/l. | Digestion Temp. (°C.) | Digestion Time (hr) | % Precipitated by alum treatment W | % Precipitated by alum treatment P | % Precipitated by alum treatment Si | AL Dissolved in Mother Liquor (g./l.) | APT Yield (%) | Al Content of APT (ppm) |
|---|---|---|---|---|---|---|---|---|---|
| 14 | 0 | — | 0 | 0 | 0 | 0 | 0.0075 | 87.7 | <12 |
| 15 | 0.16 | 45–50 | 1.5 | 0.11 | 11.1 | 82.1 | 0.015 | 93.6 | <10 |
| 16 | 0.16 | 45–50 | 24 | 0.05 | 14.7 | 82.5 | 0.25 | 93.7 | <10 |
| 17 | 0.16 | 45–50 | 48 | 0.03 | 36.4 | 88.7 | 0.178 | 94.9 | <11 |

The process of the present invention may be used to precipitate impurity metals, other than silicon and phosphorus, which affect APT yields. For instance, some arsenic is precipitated by the alum treatment. This is an additional advantage of using aluminum to precipitate silicon and phosphorus.

It is advantageous to add alum as a concentrated solution e.g. 0.5 M or more. A saturated alum solution may be used (~1 M). However, it may be added as a solid if dilution must be minimized. As the alum dissolves, the aluminum precipitates as the hydroxide.

Other soluble aluminum salts may be used, e.g., the nitrate or chloride. Aluminum sulfate is preferred because of its cheapness and because the sulfate ion is compatible with typical crystallization circuits. Aluminum hydroxide itself may be added as a solid or slurry, instead of precipitating it in situ by adding a soluble aluminum salt. This avoids the addition of foreign anions to the APT crystallizer feed.

Multistage alum treatments may also be used, vs. the single-stage treatments described here.

What is claimed is:

1. In the evaporative crystallization of ammonium tungstate solution containing dissolved silicon and phosphorus impurities to obtain ammonium paratungstate, the improvement which comprises adding a soluble aluminum salt or aluminum hydroxide to the ammonium tungstate solution in amounts such that the addition provides about 0.3 to 4 parts by weight of aluminum to 1 part by weight of dissolved silicon expressed as SiO$_2$ and digesting the resultant solution at a temperature of at least about 45° C. for a period of at least about one half hour immediately prior to crystallization of ammonium paratungstate and then removing precipitated silicon and phosphorus impurities and recovering the crystallized ammonium paratungstate whereby the yield of ammonium paratungstate is increased while at the same time the aluminum content is maintained at a level no greater than about 20 ppm aluminum.

2. Method in accordance with claim 1 wherein aluminum salt is added as a solution of aluminum sulfate.

3. Method in accordance with claim 1 wherein the addition provides about 0.3 to 2 parts by weight of aluminum to 1 part by weight of dissolved silicon expressed as SiO$_2$.

4. Method in accordance with claim 1 wherein the addition is aluminum chloride.

5. Method in accordance with claim 1 wherein the addition is aluminum nitrate.

6. Method in accordance with claim 1 wherein the digestion step is carried out at temperatures of between about 50° C. and 61° C.

7. Method in accordance with claim 1 wherein the digestion step is carried out for a period of between about 0.5 and 2 hours.

8. Method in accordance with claim 1 wherein the ammonium tungstate solution is digested at a temperature of about 50° C. for a period of between about 1 and 2 hours before the addition of the aluminum salt or aluminum hydroxide.

9. Method for recovering tungsten from tungsten ores and concentrates containing molybdenum, silicon and phosphorus impurities, which comprises: digesting the tungsten ore or concentrate with an alkaline solution, treating the digested solution with an acid to precipitate molybdenum and silicon impurities, subjecting the acidified solution to solvent extraction followed by stripping with aqueous ammonium to form an ammonium tungstate solution, adding a soluble aluminum salt or aluminum hydroxide to the ammonium tungstate solution in amounts such that the addition provides about 0.3 to 2 parts by weight of aluminum to 1 part by weight of dissolved silicon as $SiO_2$, digesting the resultant solution at a temperature of between about 45° C. and 61° C. for a period of between about 0.5 and 3 hours and then recovering crystallized ammonium paratungstate while at the same time removing precipitated silicon and phosphorus, the ammonium paratungstate containing no more than about 20 ppm aluminum.

* * * * *

UNITED STATES PATENT AND TRADEMARK OFFICE
CERTIFICATE OF CORRECTION

PATENT NO. : 4,346,061
DATED : August 24, 1982
INVENTOR(S) : John B. Goddard

It is certified that error appears in the above—identified patent and that said Letters Patent is hereby corrected as shown below:

Col. 3, line 9 - delete "than" (first occurrence).

Col. 7, line 3 (claim 9), change "ammonium" (first occurrence) to -- ammonia --.

Signed and Sealed this

Twenty-eighth Day of June 1983

[SEAL]

Attest:

Attesting Officer

GERALD J. MOSSINGHOFF
Commissioner of Patents and Trademarks

UNITED STATES PATENT AND TRADEMARK OFFICE
CERTIFICATE OF CORRECTION

PATENT NO. : 4,346,061

DATED : August 24, 1982

INVENTOR(S) : John B. Goddard

It is certified that error appears in the above-identified patent and that said Letters Patent is hereby corrected as shown below:

Col. 6, line 29 (claim 1), after "content" insert -- of the ammonium paratungstate --.

Col. 6, last line (claim 9), after "treating" insert -- the digested solution with a soluble sulfide, contacting --.

Signed and Sealed this

Third Day of July 1984

[SEAL]

Attest:

GERALD J. MOSSINGHOFF

Attesting Officer

Commissioner of Patents and Trademarks